(12) United States Patent
Ashcraft et al.

(10) Patent No.: US 8,717,750 B2
(45) Date of Patent: May 6, 2014

(54) COMPUTING SYSTEM FEET

(75) Inventors: Britt C. Ashcraft, Tomball, TX (US);
Eric Chen, Houston, TX (US); Sandie N. Cheng, Cypress, TX (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 198 days.

(21) Appl. No.: 13/216,224

(22) Filed: Aug. 23, 2011

(65) Prior Publication Data
US 2013/0050938 A1 Feb. 28, 2013

(51) Int. Cl.
*G06F 1/16* (2006.01)

(52) U.S. Cl.
USPC .... 361/679.02; 345/168; 206/778; 312/293.1

(58) Field of Classification Search
CPC ............................... G06F 1/00; G06F 2003/00
USPC .......... 345/156, 163, 168, 169, 1.1, 173, 174;
206/45.25, 45.24, 37, 778, 320, 449,
206/232, 521.1, 216; 361/679.08, 679.54,
361/679.01, 679.27, 679.28, 679.17,
361/679.23, 679.15, 679.33, 679.34,
361/679.55, 679.31, 679.26, 679.02,
361/679.52; 312/223.1, 223.2, 323, 293.1,
312/237, 319.2, 334.46, 244, 270.2
See application file for complete search history.

(56) References Cited

U.S. PATENT DOCUMENTS

| | | | |
|---|---|---|---|
| D490,420 S | 5/2004 | Solomon et al. | |
| 6,933,925 B1* | 8/2005 | Gibbons et al. | 345/163 |
| D623,639 S | 9/2010 | Richardson et al. | |
| 7,817,418 B2 | 10/2010 | Bailey | |
| D638,412 S | 5/2011 | Lee | |
| D643,423 S | 8/2011 | Smith et al. | |
| 2004/0264129 A1* | 12/2004 | Lehman et al. | 361/690 |
| 2006/0002009 A1* | 1/2006 | Ridl | 360/98.06 |
| 2007/0235166 A1* | 10/2007 | Chang | 165/104.33 |

FOREIGN PATENT DOCUMENTS

| | | |
|---|---|---|
| JP | 2007241511 | 9/2007 |
| KR | 20080054127 | 6/2008 |

OTHER PUBLICATIONS

Hall, C., Apple MacBook (White) Notebook Review, http://www.pocket-lint.com/review/4632/apple-macbook-white-2009-review, Feb. 22, 2010.
Franklin, S., Laptop Lifts, http://www.gearlive.com/news/article/q408-laptop-lifts/, Mar. 12, 2009.
Moore, C.W., Xpad Non-slip Laptop Cooler & Heatshield, http://www.applelinks.com/index.php/more/xpad_non_slip_laptop_cooler_heat shield/, Sep. 20, 2007.

* cited by examiner

*Primary Examiner* — Hung Duong

(57) ABSTRACT

A computing system comprises a bottom, a channel in the bottom, and a continuous elastomeric member in the channel. The continuous elastomeric member extends includes a foot portion projecting out of the channel.

20 Claims, 4 Drawing Sheets

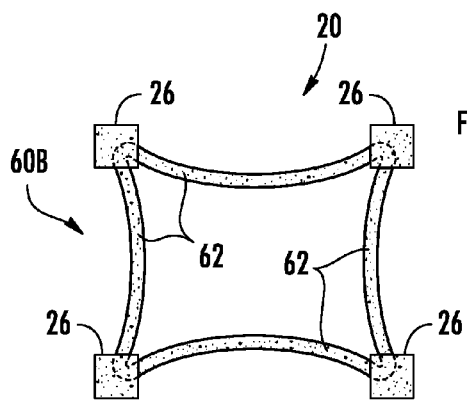
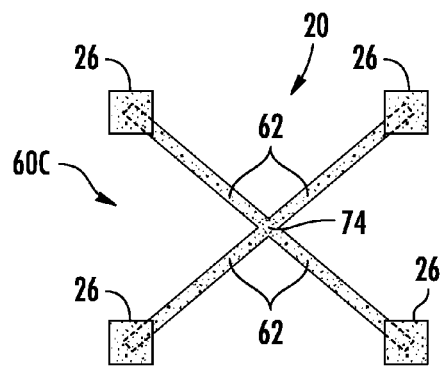
FIG. 2B    FIG. 2C
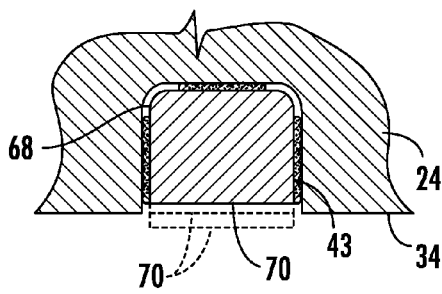
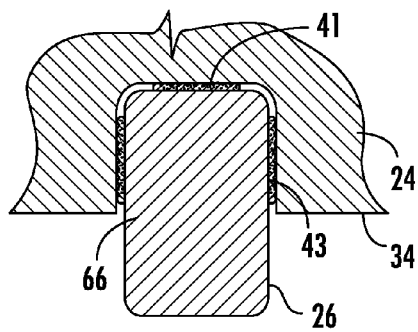
FIG. 3    FIG. 4
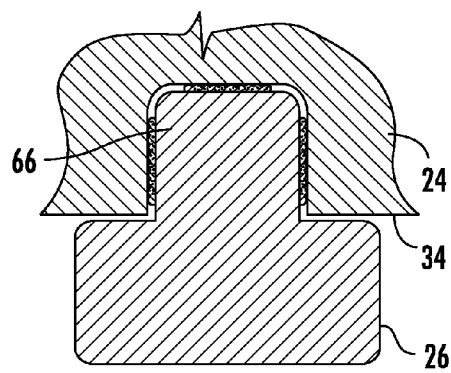
FIG. 5

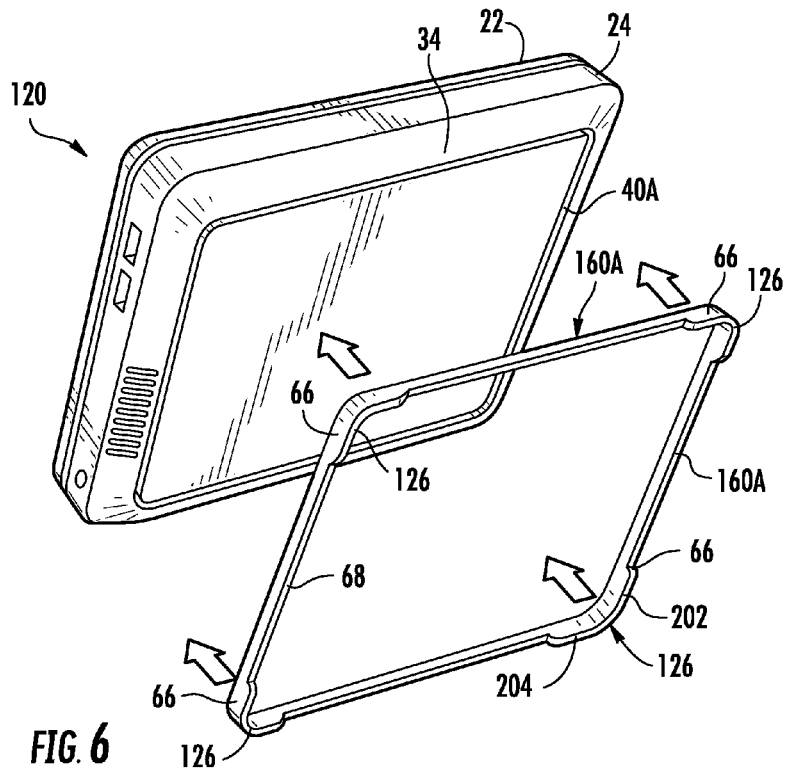
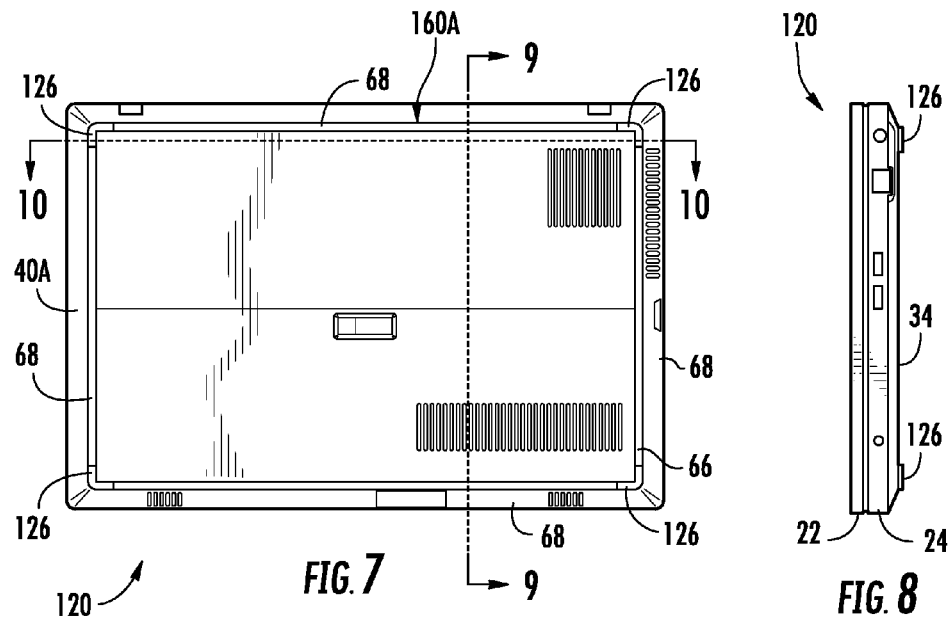

COMPUTING SYSTEM FEET

CROSS REFERENCE TO RELATED APPLICATIONS

The present application is related to U.S. Design patent application Ser. No. 29/400,128 filed on the same day herewith by Britt C. Ashcraft, Eric Chen and Sandie N. Cheng and entitled COMPUTER, the full disclosure of which is hereby incorporated by reference.

BACKGROUND

Computing systems have bottoms that are supported by distinct feet which elevate the bottom for cooling and noise suppression. The distinct feet increase the complexity and cost of such computing systems.

BRIEF DESCRIPTION OF THE DRAWINGS

FIG. 2B is a bottom plan view a second example of a feet interconnect for use with the computing system of FIG. 1.

FIG. 2C is a bottom plan view a third example of a feet interconnect for use with the computing system of FIG. 1.

FIG. 3 is a fragmentary sectional view of the computing system of FIG. 2 taken along line 3-3.

FIG. 4 is a fragmentary sectional view of the computing system of FIG. 2 taken along line 4-4.

FIG. 5 is a fragmentary sectional view of the computing system of FIG. 2 taken along line 5-5.

FIG. 6 is an exploded rear perspective view of another example of the computing system of FIG. 1.

FIG. 7 is a bottom plan view of the computing system of FIG. 6.

FIG. 8 is a left side elevation of view of the computing system of FIG. 6.

DETAILED DESCRIPTION OF THE EXAMPLES

Figure 1:
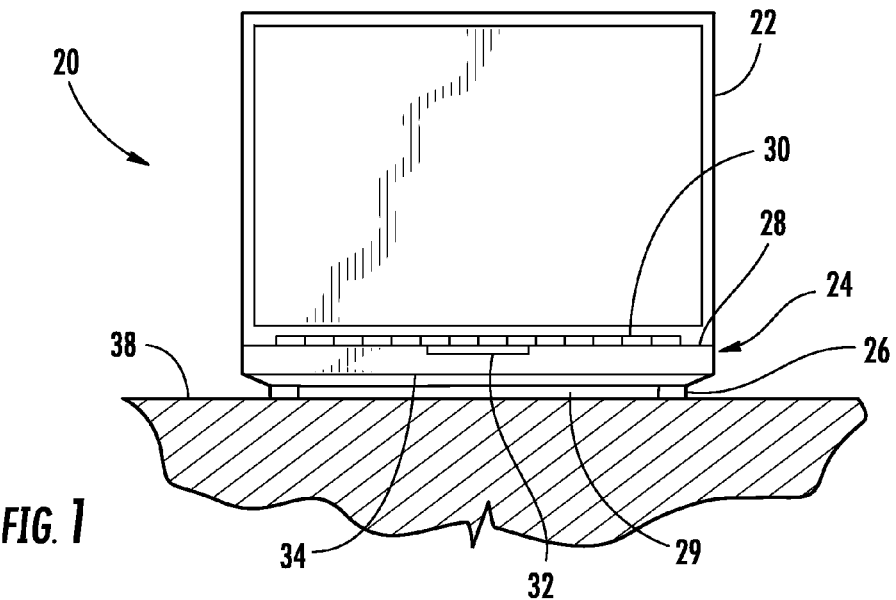
FIG. 1 is a front elevational view of a computing system according to an example.

FIG. 1 is a front elevational view a computing system 20 according to an example. As will be described hereafter, computing system 20 includes a plurality of interconnected feet along its bottom. Because the feet are interconnected, the number of parts is reduced, reducing fabrication and assembly cost. As shown by FIG. 1, computing system 20 comprises display 22, body or deck 24 and feet 26.

Display 22 comprises a display screen or monitor to present images as well as graphical user interfaces. In the example illustrated in which computing system 20 comprises a portable computing system, such as a laptop, net book or the like, display 22 is pivotably connected or coupled to deck 24. In other examples, display 22 may be a separate component or may be provided adjacent to or as part of deck 24, depending upon the configuration of computing system 20.

Deck 24 comprises a housing or body enclosing and supporting processing components for computing system 20. Deck 24 may house other components as well, such as memory, optical disk drives, communication ports, power ports, a battery receiving chamber, flash drives and the like. Deck 24 includes a top surface 28 which supports manual input devices such as keyboard 30 and keypad or touchpad 32. Deck 24 further includes a bottom surface 34 from which feet 26 extend.

Figure 2:
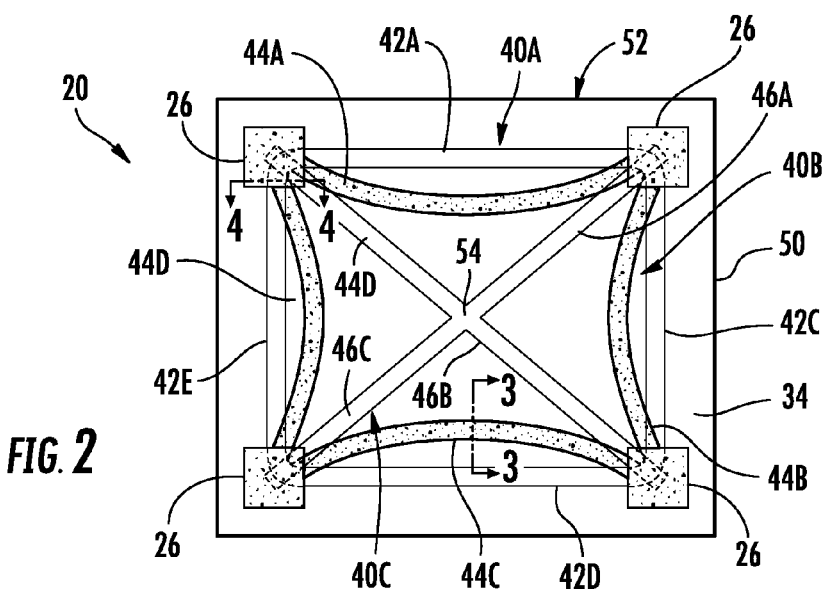
FIG. 2 is a bottom plan view of the computing system of FIG. 1 example.

FIG. 2 illustrates bottom 34 of deck 24 in more detail and a feet interconnect 62 which provides feet 26. As shown by FIG. 2, bottom 34 includes channels 40A, 40B and 40C (collectively referred to as channels 40). Channels 40 comprise grooves, depressions, indentations or recesses extending into bottom 34 which are sized and configured to at least partially receive a single continuous or integral member that provides feet 26. As shown by FIGS. 3-5, channels 40 each include a floor 41 and sides 43. In the example illustrated, sides 43 extend perpendicular to floor 41. In other examples, channel 40 may have a different cross-sectional shape such as a tongue or groove along bottom 41 or sides 43 arrangement or sides 43 that converge towards one another. In the example illustrated, each channel 40 has a substantially uniform cross-sectional shape and dimensions along its entire extent along bottom 34. In other examples, channel 40 may be non-uniform along its length or path. For example, portions of channel 40 along its path may have different shapes and configurations. In one example, those portions of channel 40 supporting an underlying feet 26 may have a different configuration as compared to those portions that do not underlie a foot 26. Channels 40 facilitate mounting of feet 26 to bottom 34 while also allowing feet 26 elevate bottom 34 upon a supporting surface 38 without obstructing airflow between surface 38 and bottom 34.

Channel 40A comprises a generally rectangular or square layout or groove arrangement, including four linear sections 42A, 42B, 42C and 42D (collectively referred to as sections 42). Sections 42 extend at 90 degree angles relative to one another, parallel to linear sides 50 which form the rectangular or square perimeter 52 of bottom 34. Because sections 42 extend in close proximity to sides 50 of bottom 34, bottom 34 has a large central area surrounded by sections 42 which is available for cooling vents, internal compartment access or other features. Because Channel 40A is continuous, forming a complete square or rectangular loop along the bottom 34, the single member providing each of feet 26 is more securely retained within channel 40A. As schematically shown in FIG. 2, feet 26 are located at each of the junctures of sections 42.

Channel 40B is similar to channel 40A except that channel 40B includes non-linear sections 44A, 44B, 44C and 44D (collectively referred to as sections 44). As with channel 40A, feet 26 are each located at the junctures of sections 44. Each of sections 44 bows inwardly towards a center point 54 of bottom 34. In yet another example, each of sections 44 may alternatively bow outwardly away from the center point of bottom 34. As a result, channel 40B provides bottom 34 with an attractive aesthetic appearance.

Channel 40C is similar to channel 40A except that channel 40C includes multiple sections 46C, 46B, 46C and 46D. Sections 46 radiate from center point 54 and extend outwardly to the locations of each of feet 26. In the example illustrated in which feet 26 are located in each of 50 corners of bottom 34, sections 46 extend from center point 54 to each of the corners of bottom 34. In other examples in which feet 26 are provided at other locations along bottom 34, sections 40 may extend outwardly from center point 54 by different extents or distances than that shown and in different directions than that specifically shown. Although channel 40C is illustrated as including four sections 44 outwardly extending from center point 54, in the other examples, channel 40C may include a greater or fewer of such sections 44 depending upon the number of feet 26 projecting from bottom 34.

Figure 2A:
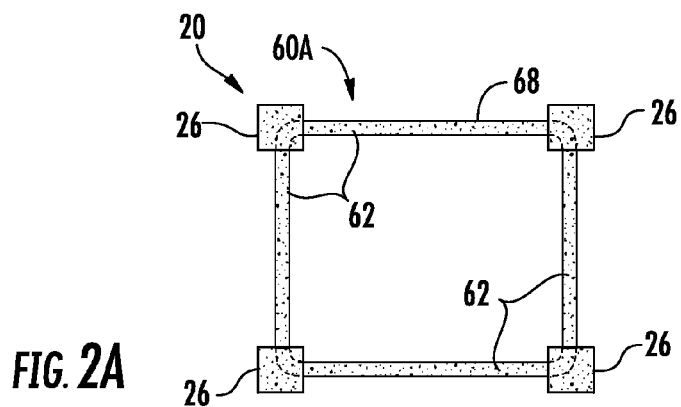
FIG. 2A is a bottom plan view of a first example of a feet interconnect for use with the computing system of FIG. 1.
Figure 9:
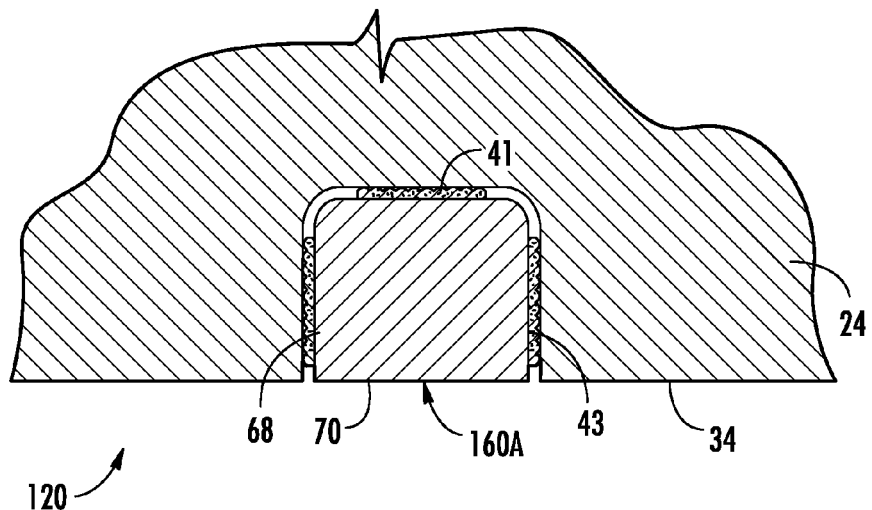
FIG. 9 is a fragmentary sectional view of the computing system of FIG. 7 taken along line 9-9.

FIGS. 2A-2C illustrate feet interconnects 60A, 60B and 60C, respectively. Feet interconnects 60A, 60B and 60C (collectively referred to as the feet interconnects 60) each comprise a single structure or member integrally formed as a single unitary body to cooperate with an associated channel 40 to mount a plurality of spaced feet 26 (schematically shown) as a single unit to bottom 34. In one example, each of feet interconnects 60 is manually bendable or flexible. In one example, each of feet interconnects 60 is further elastomeric or resiliently stretchable to facilitate insertion within channels 40. In one example, each of feet interconnects 60 is resiliently compressible or "soft", enhancing the ability of feet 26 to grip surface 38 with a high level of friction between feet 26 and surface 38. In one example, feet 26 are formed from a rubber-like material such as a natural or synthetic rubber. In one example, feet 26 are formed as a double shot part of a plastic and a thermoplastic polyurethane (TPU) having a Shore A hardness of between 70 and 100, and nominally about 85. In other examples, feet interconnects 60 may be formed from other materials and may have other material properties.

Each feet interconnect 60 includes multiple feet 26 (schematically shown) and multiple segments or sections 62 interconnecting and spacing apart feet 26. Feet 26 comprise portions of interconnects 60 that are configured to project outwardly from and downwardly beyond bottom 34 so as to elevate bottom 34 from the underlying supporting surface 38. In one example, each of feet 26 is configured to elevate bottom 34 from the underlying supporting surface 38 by a distance of at least 1 millimeter and nominally about 1.5 millimeters. In the example shown in FIG. 4, each of feet 26 extends along a portion of the associated underlying channel 40 and has a shape corresponding to the underlying channel 40. For example, in the example illustrated in which each of feet 26 is located at a corner of the square or rectangular interconnects 60, each of feet 60 would include two segments at 90 degrees with respect to one another (forming an L shape). In such an example, because such feet 26 have a shape corresponding to the underlying channel 40, as well as the underlined portion of the sections 62 of interconnects 60 that are connected to the particular foot 26, the particular foot 26 is more structurally stable. In one example, each foot 26 may additionally have a width corresponding to the width of the underlying channel 40 and the underlying sections that support the particular foot 60. Such an example, even greater structural integrity is achieved.

In yet other examples, such as the example shown in FIG. 5, feet 26 may expand outwardly (in a plane parallel to the plane of bottom 34) beyond the underlying channel 40 and the underlying supporting portion of adjacent sections 62. In other example, feet 26 may have other shapes such as circles, rectangles, squares, asterisks, stars, alphanumeric symbols and the like. Although feet 26 are each illustrated as being located at either a junction of two consecutive sections 62 or at the terminus of an associated section 62, in other examples, feet 26 may alternatively or additionally be located at other locations along sections 62.

Sections 62 comprise portions of interconnects 60 that interconnect and space apart feet 26 and that are configured to be inserted into and retained within (with or without stretching) one of channels 40. Each of sections 62 includes a foot supporting portion 66 (shown in FIG. 5) and a spacing portion 68 (shown in FIG. 3). Foot supporting portions 66 extend below feet 26 within channel 40. Spacing portions 68 separate feet 26 and have a height (measured in a direction perpendicular to bottom 34) so as to create a gap 29 (shown in FIG. 1) between the underlying supporting surface 38 and bottom 34. In one example as shown in solid lines in FIG. 3, each spacing portion 68 but when interconnects 68 is located within channel 40) has a lower surface 70 recessed within channel 40. In yet other examples, as shown in broken lines, lower surface 70 may alternatively extend flush with bottom 34 or may project below bottom 34 (but still less than the extent to which feet 26 project below bottom 34).

As shown by FIGS. 3-5, supporting portion 66 and spacing portion 68 are retained within one of channels 40. In one example, portions 66 and 68 are heat staked within the associated channel 40. In heat staking, feet 26 are positioned within channel 40 and then deformed through the softening of the plastic to form a head which mechanically locks the feet 26 within channel 40. In one example, substantially the entirety of portions 66 and 68 is heat staked within channel 40. In other examples, portion 66 and 68 may be intermittently bonded or heat staked along the receiving channel 40. In other examples, portion 66 and 68 may be retained within channels 40 by other means such as friction fits, undercuts, adhesives, fasteners or the like.

FIGS. 2A-2C illustrate example arrangements of feet 26 and section 62 which are configured to cooperate with the various channels 40 shown in FIG. 2. As shown by FIG. 2A, feet interconnect 60A comprises a square or rectangular ring or loop of four linear or straight sections 62 and feet 26 for use with channel 40A. As shown by FIG. 2B, feet interconnect 60B comprises a ring or loop of four bowed sections 62 and feet 26 for use with channel 40B. As shown by FIG. 2C, feet interconnect 60C comprises four linear or straight sections 62 that radiate outwardly from a central point 74 to feet 26 for use with channel 40C. FIG. 2 illustrates feet interconnect 60C retained within channel 40C. In other examples, other feet interconnects 60, having different configurations, may be employed depending upon the configuration of the channels 40 provided in bottom 34.

In the example shown in FIG. 2, bottom 34 includes each of channels 40A, 40B and 40C, enabling bottom 34 to be utilized with any of feet interconnects 60A, 60B and 60C and offering customization. Those channels 40 that are not used (that are not filled with a feet interconnect 62) provide additional aesthetic design. In other examples, bottom 34 may be the fight with the fewer greater of such different channels. In particular examples, bottom 34 may be provided with a single one of channels 40, where bottom 34 is for use within assigned one of feet interconnects 60.

FIGS. 6-10 illustrate computing system 120, a particular example of computing system 20. In the example shown, computing system 120 comprises a laptop or net book computing system having a pivotable monitor or display screen 22. As with computing system 20, computing system 120 has a bottom 34 provided with a single unitary or integral body or member providing multiple spaced feet. In the example shown, bottom 34 includes channel 40A and feet interconnect 160A. Channel 40A is described above with respect to computing system 20.

Figure 10:
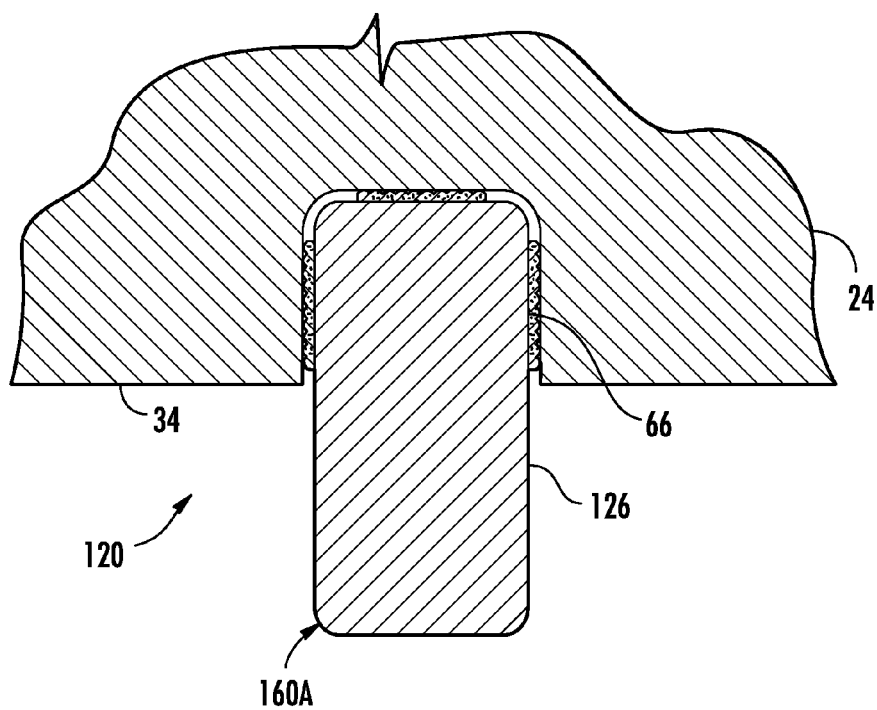
FIG. 10 is a fragmentary sectional view of the computing system of FIG. 7 taken along line 10-10.

Feet interconnect 160A comprises a particular example of feet interconnect 60A. Those portions of feet interconnect 160A which correspond to portions of feet interconnect 60A are numbered similarly. Feet interconnect 160A is identical to feet interconnect 60A except that feet interconnect 160A includes the 126, a particular example of feet 26 which were schematically shown in computing system 20. As shown by FIG. 6, each of feet 126 extends along a portion of the associated underlying channel 40A and has a shape corresponding to the underlying channel 40A. Because each of feet 126 is located at a corner of the square or rectangular loop, each of feet 126 includes two segments 202, 204 at 90 degrees with respect to one another (forming an L shape). Because feet 126 have a shape corresponding to the underlying channel 40A, as well as the underlying foot supporting portion 66 of the sections 62 of interconnect 160A, each foot 126 is more structurally stable. As shown by FIG. 10, each foot 126 has a width corresponding to the width of the underlying channel 40A and the supporting portion 66 to offer greater structural integrity.

Although the present disclosure has been described with reference to examples, workers skilled in the art will recognize that changes may be made in form and detail without departing from the spirit and scope of the claimed subject matter. For example, although different examples may have been described as including one or more features providing one or more benefits, it is contemplated that the described features may be interchanged with one another or alternatively be combined with one another in the described examples or in other alternative examples. Because the technology of the present disclosure is relatively complex, not all changes in the technology are foreseeable. The present disclosure described with reference to the examples and set forth in the following claims is manifestly intended to be as broad as possible. For example, unless specifically otherwise noted, the claims reciting a single particular element also encompass a plurality of such particular elements.

What is claimed is:

1. A computing system comprising:
   a bottom;
   a channel in the bottom; and
   a continuous elastomeric member in the channel, wherein the continuous elastomeric member includes:
   a first foot portion projecting out of the channel; and
   a second foot portion projecting out of the channel; and
   a first intermediate portion between the first foot portion and the second foot portion, wherein the first foot portion and the second foot portion project beyond the first intermediate portion.

2. The computing system of claim 1, wherein the first intermediate portion is recessed below or flush with the bottom adjacent the channel.

3. The computing system of claim 1, wherein the channel has four corners and wherein the continuous elastomeric member further comprises:
   a third foot portion extending out of the channel;
   a second intermediate portion between the second foot portion and the third foot portion that is recessed relative to the second foot portion and the third foot portion;
   a fourth foot portion extending out of the channel;
   a third intermediate portion between the third foot portion and the fourth foot portion that is recessed relative to the third foot portion and the fourth foot portion; and
   a fourth intermediate portion between the fourth foot portion and the first foot portion that is recessed relative to the fourth foot portion and the first foot portion, wherein each of the four corners includes one of the first foot portion, the second foot portion, the third foot portion and the fourth foot portion.

4. The computing system of claim 1, wherein the first intermediate portion is curved.

5. The computing system of claim 1, wherein the first intermediate portion linearly extends from the first foot portion to the second foot portion.

6. The computing system of claim 1, wherein the first intermediate portion includes a first section and a second section, the first section and the second section radiate from a location to the first foot portion and the second foot portion, respectively.

7. The computing system of claim 1, wherein the continuous elastomeric member has a Shore A hardness of between 40 and 50.

8. The computing system of claim 1, wherein the channel has a floor.

9. The computing system of claim 1, wherein the continuous elastomeric member is heat staked in the channel.

10. The computing system of claim 1, wherein the first foot portion and the second foot portion each have a first segment and a second segment extending substantially perpendicular to the first segment.

11. The computing system of claim 1, wherein the bottom has a perimeter including a plurality of linear sides.

12. The computing system of claim 1, wherein the first foot portion has a first segment and a second segment extending perpendicular to the first segment.

13. The computing system of claim 1, wherein the first intermediate portion has a length continuously extending from the first foot portion to the second foot portion and wherein an entirety of the length is within the channel.

14. The computing system of claim 1, wherein an entirety of the continuous elastomeric member, but for one or more feet portion, including the first foot portion and the second foot portion, is contained within the channel.

15. The computing system of claim 1, wherein the bottom faces in a downward direction and wherein the first foot portion and the second foot portion each project out of the channel and beyond the first intermediate portion in the downward direction.

16. A method comprising:
   retaining a single continuous elastomeric member having a plurality of spaced apart feet along its length within a channel of a computing device along the bottom of the computing device, wherein the feet project from the channel to elevate the bottom of the computing device.

17. A computing system comprising:
   a bottom having a perimeter including a first corner, a second-corner, a third corner and a fourth-corner;
   a channel in the bottom extending parallel to the perimeter along an entirety of the perimeter;
   a continuous elastomeric member in the channel, the continuous elastomeric member comprising:
   a first foot portion extending out of the channel along the first corner;
   a second foot portion extending out of the channel along the second corner;
   a third foot portion extending out of the channel along the third corner;
   a fourth foot portion extending out of the channel along the fourth corner, wherein each of the first foot portion, the second foot portion, the third foot portion and the fourth foot portion are spaced from one another by an intermediate portion recessed relative to the first foot portion, the second foot portion, the third foot portion and the fourth foot portion.

18. The computing system of claim 17, wherein each of the first foot portion, the second foot portion, the third foot portion and the fourth foot portion comprises a first segment and a second segment perpendicular to the first segment.

19. The computing system of claim 17, wherein the first intermediate portion has a length continuously extending from the first foot portion to the second foot portion and wherein an entirety of the length is within the channel.

20. The computing system of claim 17, wherein an entirety of the continuous elastomeric member, but for one or more feet portion, including the first foot portion and the second foot portion, is contained within the channel.

* * * * *